US012434899B2

(12) United States Patent
Carter

(10) Patent No.: US 12,434,899 B2
(45) Date of Patent: Oct. 7, 2025

(54) MULTIPLE SOFT JACKET CAN COOLER JACKETS HOLDER AND DISPENSER

(71) Applicant: Ryan Carter, Austell, GA (US)

(72) Inventor: Ryan Carter, Austell, GA (US)

( * ) Notice: Subject to any disclaimer, the term of this patent is extended or adjusted under 35 U.S.C. 154(b) by 35 days.

(21) Appl. No.: 18/518,680

(22) Filed: Nov. 24, 2023

(65) Prior Publication Data

US 2024/0182228 A1 Jun. 6, 2024

Related U.S. Application Data

(60) Provisional application No. 63/430,031, filed on Dec. 4, 2022.

(51) Int. Cl.
*B65D 81/38* (2006.01)
*F16M 13/02* (2006.01)

(52) U.S. Cl.
CPC ....... *B65D 81/3876* (2013.01); *F16M 13/022* (2013.01)

(58) Field of Classification Search
CPC .......................... B65D 81/3876; F16M 13/022
USPC .......................................................... 220/737
See application file for complete search history.

(56) References Cited

U.S. PATENT DOCUMENTS

D322,905 S * 1/1992 Decker .......................... D6/515
D347,344 S * 5/1994 Schumaker .................... D6/515
5,328,258 A * 7/1994 Scalise ...................... A47F 1/08 312/319.1
D367,345 S * 2/1996 Swenor ............................ D34/6
5,788,117 A * 8/1998 Zimmanck ................ A47F 1/08 221/281
5,836,478 A * 11/1998 Weiss ..................... B65D 5/725 229/122.1
6,059,140 A * 5/2000 Hicks ................. B65D 81/3879 220/6
6,991,116 B2 * 1/2006 Johnson .................. A47F 1/087 312/45
D605,442 S * 12/2009 Elhalwani ...................... D6/515
D618,073 S * 6/2010 Stephens ........................ D7/701
D690,958 S * 10/2013 Orton ............................. D6/515
D727,056 S * 4/2015 Frankel .......................... D6/518
9,096,345 B2 * 8/2015 Bogdziewicz ....... B65D 5/0227
9,533,794 B2 * 1/2017 Vara ..................... B65D 23/085
D779,852 S * 2/2017 Covert ........................... D6/516
9,771,215 B2 * 9/2017 Rogers ..................... B65F 1/062
9,795,235 B1 * 10/2017 Bouse ................ A47G 23/0216
10,058,195 B2 * 8/2018 Bernard .................. A47F 1/087
10,364,086 B1 * 7/2019 Bouse ................ A47G 23/0216
D904,068 S * 12/2020 Boeltl ............................ D6/522
2009/0212066 A1 * 8/2009 Bauer ....................... A47F 7/28 221/281
2010/0170913 A1 * 7/2010 Shoshani ............. A47K 10/426 221/45
2011/0192859 A1 * 8/2011 Belford ...................... F25D 3/08 220/739
2012/0325842 A1 * 12/2012 Restaino ............ B65D 83/0864 221/282

(Continued)

*Primary Examiner* — Ernesto A Grano

(57) ABSTRACT

A holder and dispenser designed to hold multiple soft jacket can coolers; designed to hang on a wall or to sit on a shelf, counter, or table top. The product is made with interlocking pieces, the product also has indentions on the back and sides for magnets so the product can be attached to a refrigerator or other metallic surface. The product holds, organizers and dispenses soft jacket can coolers.

2 Claims, 10 Drawing Sheets

(56) References Cited

U.S. PATENT DOCUMENTS

| | | | | |
|---|---|---|---|---|
| 2014/0361024 | A1 * | 12/2014 | DeGraaf | B65D 25/10<br>220/676 |
| 2015/0027604 | A1 * | 1/2015 | James | A63B 60/62<br>220/592.24 |
| 2015/0291313 | A1 * | 10/2015 | Vara | B65D 23/085<br>220/737 |
| 2024/0182228 | A1 * | 6/2024 | Carter | F16M 13/022 |

* cited by examiner

MULTIPLE SOFT JACKET CAN COOLER JACKETS HOLDER AND DISPENSER

BACKGROUND

Soft jacket can coolers, more commonly called koozies or huggers or coolies, are collapsible soft foam jackets that wrap around a canned beverage to keep the beverage cold. These collapsible soft jacket can coolers are often given away as a promotional items by businesses or individuals promoting their business. They are usually laid across a table or sitting in a bag not well organized to distribute or give away at trade shows or promotional events. A holder and dispenser for soft jacketed can coolers is an organized and efficient way to distribute the soft jacket can coolers at trade shows and promotional events and in office settings and in product sales displays and anywhere soft jacket can coolers are sold or distributed to individuals. Many people have a number of soft jacket can coolers in their home which are often tossed in a basket or drawer, unorganized, taking up a lot of space. A holder and dispenser for soft jacket can coolers is handy around the home to organize and keep your soft jacket can coolers stacked together and ready to dispense saving a lot of space. This soft jacket can cooler holder and dispenser can be magnetized to the side of a metal surface or refrigerator, can be mounted to a wall with a fastener, or sit on a counter or in a cabinet.

While soft jacket can coolers are popular, products that hold and dispense soft jacket can coolers are not commonly available. One reason is the products are expensive. The plastic product, which has a one piece mold, is expensive, because it has a very high mold cost. The wooden product is also expensive and not attractive or well suited to use as a promotional tool. There are a few unique features of this holder and dispenser that separate it from the rest of the comparable items. None of the other items have a partial ejection space indention that let's out a portion of the next in line soft jacket can cooler to make it even easier to get your fingers on the collapsed can cooler for dispensing. None of the other products can be disassembled into pieces that stack on each other to save a great deal of space while in transit, while being stored, or distributed in mass quantities. Mold costs are greatly decreased because of the individual pieces as well. When assembled, the dispensing area is raised up off the surface of which it is sitting and has a finger space indention for easy grabbing as well. With the top in the closed position an individual soft jacket can cooler can be inserted into the holder dispenser without opening the top. With the top in the open position rotated back around the hinge, as many soft jacket can coolers as you can hold in one hand can be inserted at once into the holder dispenser making it very quick to load and ready to dispense.

Summary of the Product

This soft jacket can cooler holder and dispenser is a promotional tool as well as a household organizational item capable of holding and dispensing multiple soft jacket can coolers. Multiple soft jacket can coolers can be loaded into the top of the product at the same time. The product can be fastened to a wall, magnetized to refrigerator, or sit on the surface. While sitting on a surface the product is angled back slightly so the soft jacket can coolers can be more easily removed. The product can be disassembled into pieces for packaging or storage and reassembled for use. The product has a partial ejection space in the front that allows a portion of the next inline soft jacket can cooler to partially dispense from a dispensing area in the front exposing a place to pinch the soft jacket can cooler and remove it from the dispenser.

Main Components of the Invention

Front: The front of the product is where soft jacket can coolers are dispensed. The front of the product has a slot opened from the top running down a portion of the front component connecting at the bottom. The top of the front component also has a latching mechanism that the top component secures into. Below the front component is the finger space indention, below that is the partial ejection space, below that is the dispensing area. Below the dispensing area, the horizontal bottom component holds up the soft jacket can coolers above the surface of which the product is sitting on. The horizontal bottom component also has a finger space indention. The slot that runs down the front component allows multiple soft jacket can coolers to be loaded simultaneously by allowing a thumb and finger to slide into the product while holding multiple soft jacket can coolers in said thumb and finger.

Back: The back of the product has hinging device at the top that the top component fastens to. There is a space below that, that allows the top component to swing open freely. The back component is joined to the side components and the bottom component which interlock. The back component also has a mounting hole for a fastener so the product can be mounted to a wall or vertical surface. Below the back component is an open area separating the side components that come down below the bottom component on each side. The back component has indentions where magnets can be installed to magnetize the product to a metal surface. The back component has openings to see how many soft jacket can coolers are left in the product.

Sides: The sides of the product are joined to the bottom, top, back, and front components which interlock. The side components have indentions where magnets can be installed to magnetize the product to a metal surface. The side components have openings to see how many soft jacket can coolers are left in the product. The top of the side components are square but the bottom of the side components are angled so the product leans back when sitting on a surface so these soft jacket can coolers are more easily dispensed. When sitting on a surface the product is held up by both the side components. At the top back inside corner of each side component there is an indention where the top fastens to the side components to create a hinging mechanism.

Top: The top is where the soft jacket can coolers are loaded into the product. The top component of the product has an opening that starts in the front and runs a portion to the back where the top component comes together. The opening allows an individual soft jacket can cooler to be inserted into the product with the top component in the closed position. The opening in the top component aligns with the slot in the front to easily load soft jacket can coolers. The back outside portion of the top component has extensions on each side to fasten to the indentions on the side components to create the hinging mechanism. The top component has a latching mechanism on the front portion of the top component that latches to the front component latching mechanism. The top component can be removed if unwanted to make it easier to load soft jacket can coolers into the product as it is not needed in the integrity of the product unless a lid or top is desired.

Bottom: The bottom of the product has an open area that raises the dispensing area up off the surface it is sitting on. The bottom component is joined to the front, back, and side components which interlock. The bottom component has a finger space intention in the front portion.

Dispensing: At the bottom of the front component there is a partial ejection space indention which is directly below the finger space indention. The partial ejection space indention is just wide enough to allow only a portion of the next in line soft jacket can cooler to partially dispense. So as a soft jacket can cooler is being dispensed, the soft jacket can cooler next in line on top of it slides out of the dispensing area only an amount allowable by the partial ejection space indention. Now the soft jacket can cooler to be dispensed is sticking out just enough to easily grab onto, with the help of the finger space indention and the raised dispensing area. Then the process repeats itself with each soft jacket can cooler that is dispensed. The partial ejection space indention is at the top of the dispensing area. The raised dispensing area and finger space indentions allow more room to grab onto the soft jacket can cooler.

Loading: There are two ways that soft jacket can coolers can be loaded into the product. With the top component in the closed position an individual soft jacket can cooler can be pushed through the opening of the top of the product without opening the lid. With the top component in the open position as many soft jacket can coolers as you can hold between your thumb and fingers can be loaded into the product at the same time. This is made possible by the slot in the front component that allows the thumb and finger into the product along with the soft jacket can coolers that are being loaded. This is especially convenient when at a promotional event and you don't want to spend too much time organizing promotional items like soft jacket can coolers.

Product Improvements

- Partial Ejection Space Indention
- The disassembly into pieces for distribution and storage of/or packaging into minimal space
- The low molding cost of individual pieces
- The front loading slot
- Finger Space Indention
- The raised Dispensing Area
- The slanted bottom sides to tilt the unit back for a better dispensing angle
- The low molding cost
- The top opening space
- The wall mounting holes in the back
- The magnet indentions

CALL OUT NUMBER DESCRIPTION

Figure 1:
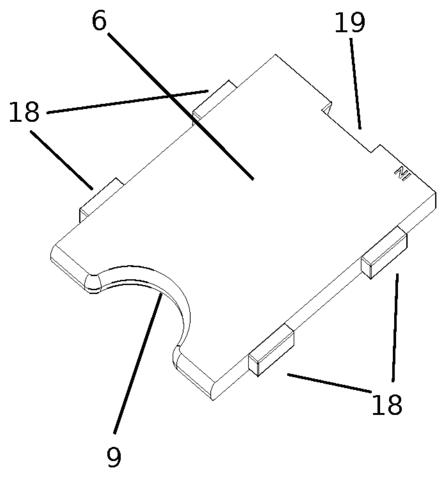
FIG. 1 is a view of the bottom of the device

1. Left side component
2. Right side component
3. Front component
4. Top component
5. Back component
6. Bottom component
7. Fastening hole in the back component to hang over a fastener
8. Openings on the side components
9. Finger space indention are created in a recessed area that is approximately a half circle, on the bottom component
10. Openings in back component
11. Slot opening in the front component for loading
12. Horizontal connecting section below the slot on the front component
13. Opening on the top component
14. Snap joint attachment mechanisms
15. Indentations for holding magnets
16. Partial ejection space indention on the front component
17. Finger space indention on the front component created by a upward recessed area on the horizontal portion below the slot on the front component.
18. Interlocking tabs to insert into the openings (27) and (29) of the side components (1) and (2) to join to the bottom component (6).
19. Recessed connecting area (indent) in the back of the bottom component to interlock with the tab (25) on the bottom of the back component (5).
20. Indents to fit the latching mechanism (#23) on the top of the front component to latch the top component (4) to the front component (3).
21. The sloped bottom edge of side components so the product sits back at an angle.
22. Sides of the top component
23. Latching mechanism Interlocking tabs that latch the top component (4) to the front component (3).
25. Interlocking extension on the back component (5) to connect to recessed area (19) in the bottom component.
26. Recessed area (indents) on the back component to interlock with interlocking extensions on the side components (31).
27. Openings on the left side component (1) to join with interlocking tabs (18) of the bottom component (6).
28. Recessed area (indents) on the front component (3) to hold interlocking extensions (30) of the side panels (1) and (2).
29. Openings on the right side component (2) to hold interlocking tabs (18) of the bottom component (6).
30. Extensions on the side components (1) (2) which interlock with the recessed connecting area (28) of the front component (3).
31. Extensions on the side components (1) (2) that interlock with the recessed connecting area (26) of the back component (5).
32. Dispensing area
34. Bottom of soft jacketed can cooler when collapsed, extending in a tab configuration
35. Soft jacketed can cooler
36. Hinge connecting point on) components

DETAILED DESCRIPTION

FIG. 1 shows the bottom component. The bottom component 6 has interlocking extensions 18 that connect to 27 and 29 of the side components. It also has a finger space indention 9 which along with the finger space indention 17 on the front panel allows the can coolers to be dispensed.

The recessed area in the back of the bottom component 19 connects to the interlocking extension 25 of the back component. A tight fit causes 19 (the recessed area) and 25 (the interlocking extension) to interlock.

Figure 2:
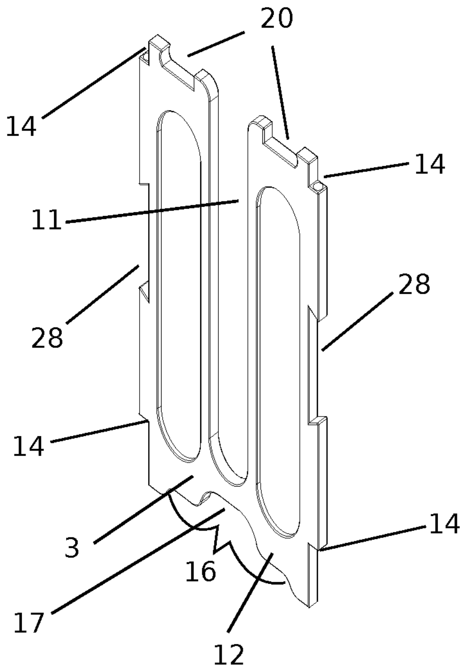
FIG. 2 is a view of the front piece of the device.

FIG. 2 shows the front section. The parts of the front component are the slot 11, which allows multiple soft jacket can coolers to be loaded at the same time. The front slot 11 is designed to allow a thumb and finger into the holder dispenser as they are holding as many soft jacket can coolers as possible with the top component 4 lid in the open position. The horizontal section 12, which extends from both sides of the front component 3 is below the slot which connects each side the front component and is where the finger space indention 17, and partial ejection space indention 16 are located. The partial ejection space 16 is an indention in the bottom of the front component 3 and is wider than the finger space indention 17 directly above it, and the partial ejection space 16 is only wide enough to let the bottom tab 34 of the next in line soft jacket can cooler partially dispense from the holder dispenser. The soft jacket can cooler being dispensed pulls the next in line soft jacket can cooler out with it only to the point where the outside edge of the next in line soft jacket can cooler make contact with the outer edge of the partial injection space indention 16, and stop the next in line soft jacket can cooler from being dispensed completely. This leaves the bottom tab of the next in line soft jacket can cooler sticking out of the holder dispenser. The partially ejected soft jacket can cooler along with the finger space indentions on the front component 17 and the bottom component 9, and the raised dispensing area makes pulling a soft jacket can cooler out of the holder dispenser very ergonomic. The top of the front component has indents 20 to fit the interlocking pieces 23 that act as the lid latching mechanism and the front component has recessed connecting areas 28 on either side of the front piece which allows the interlocking extensions of the side components 30, a tight fit between 28 and 30 allows the parts to interlock with a snapping action.

Figure 3:
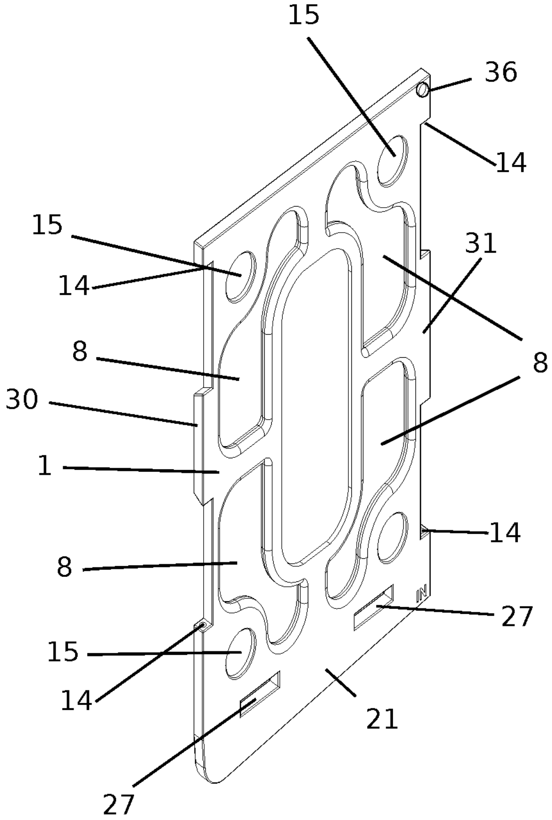
FIG. 3 is a view of the left side of the device.

FIG. 3 shows the left side component 1. The left side component has openings 8 which allow for soft jacket can coolers to be adjusted inside the holder dispenser, and they also reduce the weight of the holder/dispenser. The left side component has a slanted bottom edge 21, and above the slanted edge, openings 27 for the interlocking extensions 18 of the bottom component 6. The left side component also has indentions 15 for holding magnets, The left side component also has extensions, the front extension 30 interlocks into the recessed connecting areas 28 of the front component 3 and back extension 31 interlocks with the recessed area 26 of the back component 5. FIG. 3 also shows the back top location of the hinge element 36 that allows the top to be opened.

Figure 4:
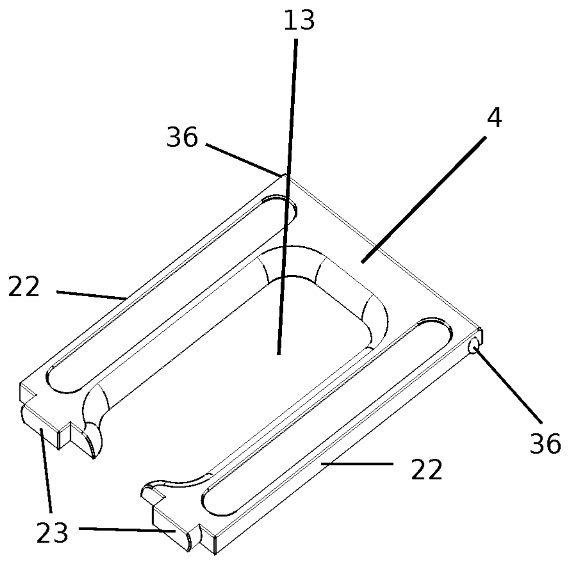
FIG. 4 is a view of the top side of the device.

FIG. 4 shows the top component 4 of the device. An open area 13 allows an individual soft jacket can cooler to be loaded into the holder dispenser with the top component lid in the closed position. The side portions 22 of the top component 4 are between tops of the side components 1 and 2, holding the soft jacket can coolers in the holder dispenser and the front of the top component has interlocking pieces 23 that fit into the recessed connecting areas 20 in the front component acting as the latching mechanism. The top component can be opened and closed as 20 and 23 provide the latching mechanism and the back outside edges of the top component have a hinging mechanism 36 allowing the top component to rotate open and closed.

Figure 5:
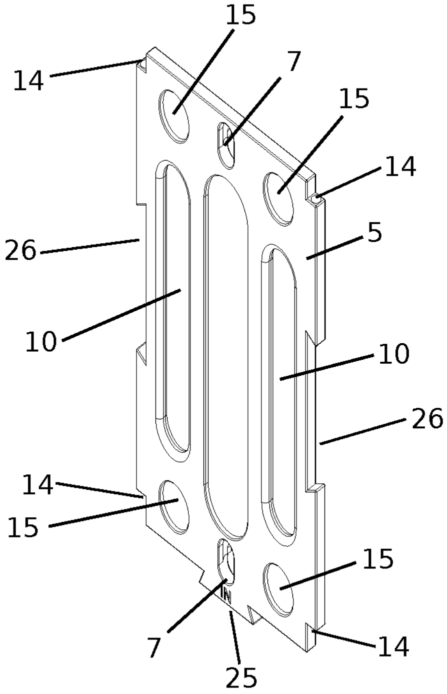
FIG. 5 is a view of the back of the device.

FIG. 5 shows the back component. The back 5 has openings 10 for reducing weight. The back component 5 also has indentations 15 for magnets so the product can be placed on a refrigerator or other metallic object. The back also has a hole 7 that is designed to go over a fastener to hold the holder and dispenser on wall or vertical surface. A recessed connecting area 26 interlocks with extensions 31 of the side components, and an extension 25 on the bottom of the back component interlocks with recessed connecting area 19 on the bottom component.

Figure 6:
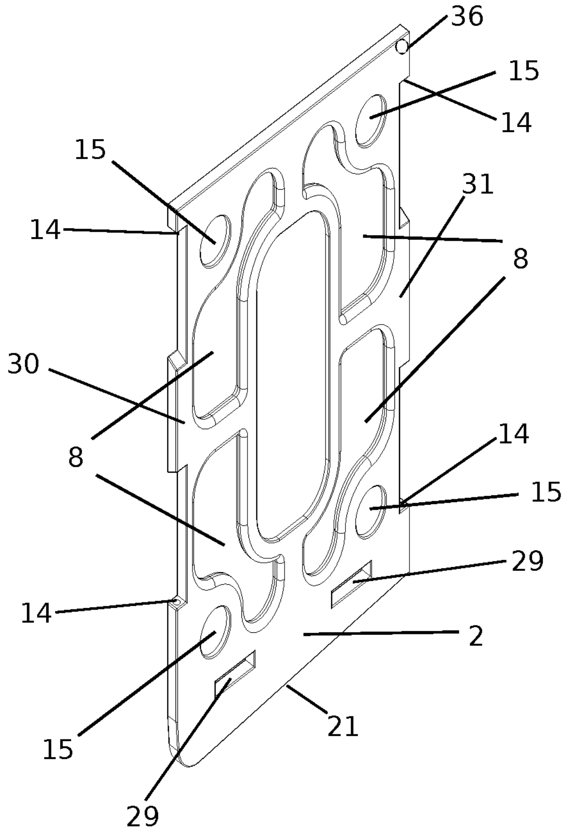
FIG. 6 is a view of the right side of the device.

FIG. 6 shows the right side component 2. The right side component has openings 8 which allow for soft jacket can coolers to be adjusted inside the holder dispenser, and they also reduce the weight of the holder/dispenser. The right side component has a slanted bottom edge 21, and above the slanted edge, openings 29 for the interlocking extensions 18 of the bottom component. The right side component also has indents 15 for holding magnets The right side component also has extensions, the front extension 30 interlocks into the recessed areas 28 of the front component and back extension 31 interlocks with the recessed connecting area 26 of the back component.

Figure 7:
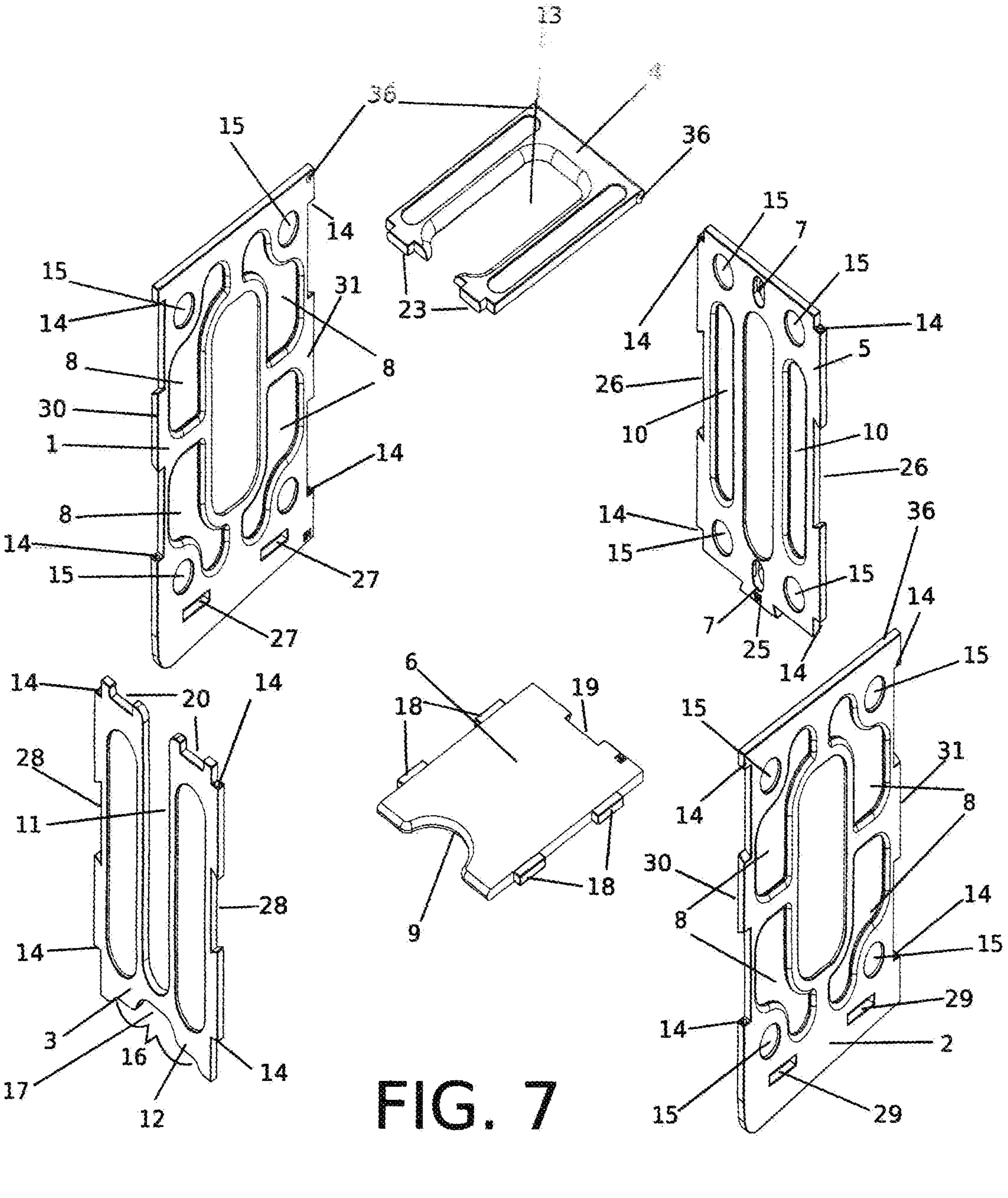
FIG. 7 is a view of all the parts of the device prior to assembly.

FIG. 7 shows the position of all six sides before they are interlocked into a final assembly.

Figure 8:
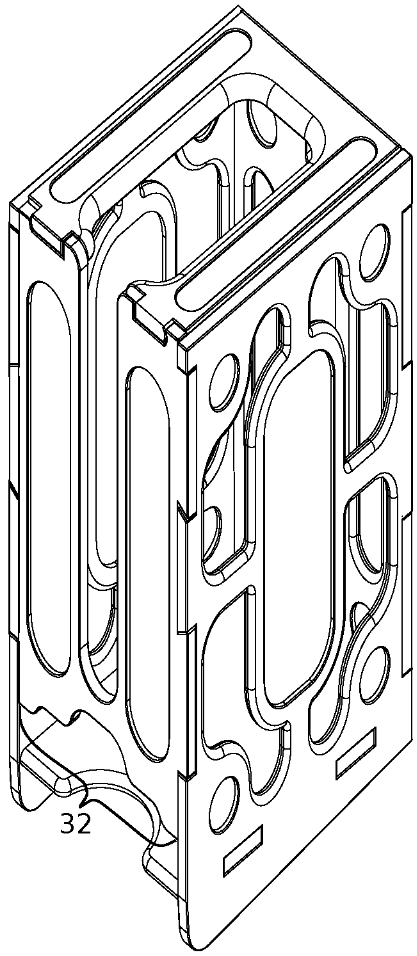
FIG. 8 is a ¾ front right corner view of the assembled dispenser holder.

FIG. 8 is a ¾ front corner view of the assembled dispenser holder, particularly showing the dispensing area 32.

Figure 9:
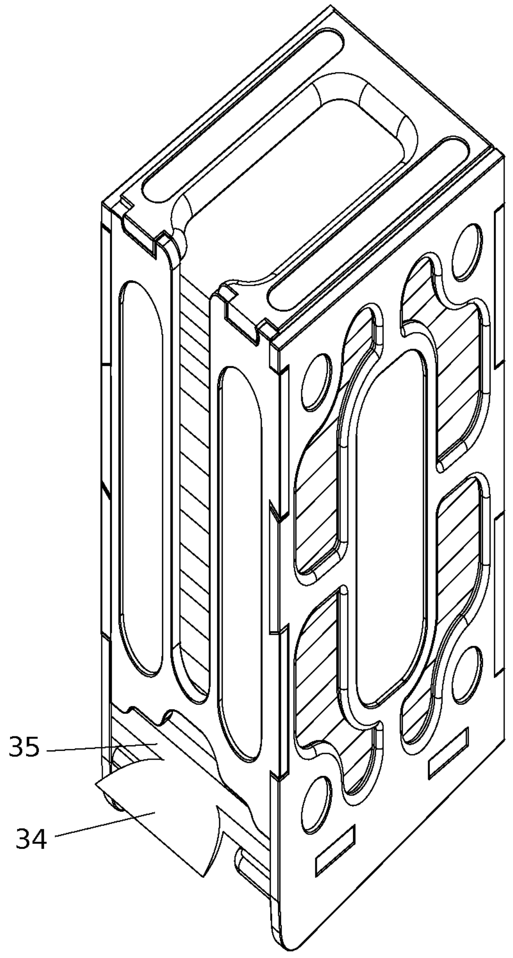
FIG. 9 is a ¾ front right corner view of the assembled dispenser holder with a collapsed soft jacket can cooler being pulled by the bottom section of the can cooler.

FIG. 9 is a ¾ front corner view of the assembled dispenser holder with a collapsed soft jacket can cooler 35 being pulled by the bottom section of the can cooler 34, with the collapsed can cooler bottom being the tab that allows the can cooler to be pulled out.

Figure 10:
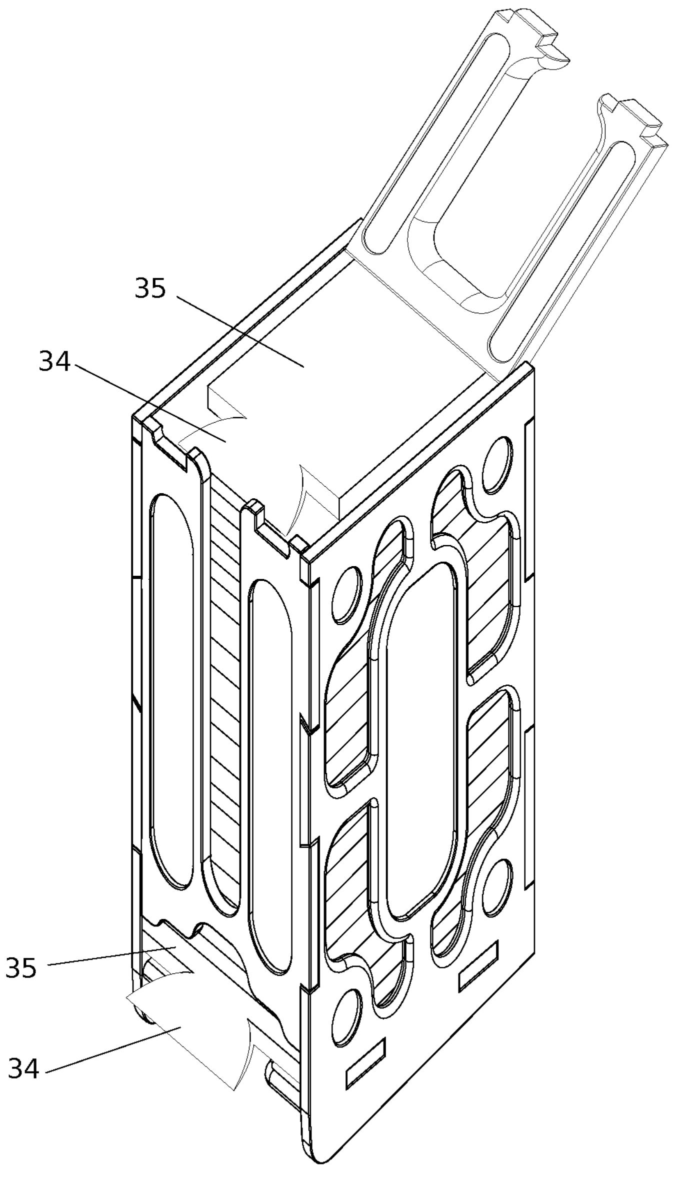
FIG. 10 is a ¾ front right corner view of the dispenser holder with the collapsed soft jacketed can coolers present in the invention showing the bottom collapsed section which acts like a tab for pulling out the soft jacketed can coolers.

FIG. 10 is a ¾ front corner view of the dispenser holder with the collapsed soft jacketed can coolers present in the invention showing the bottom collapsed section 34 which acts like a tab for pulling out the soft jacketed can coolers 35.

I claim:

1. A multiple soft jacket can cooler jackets holder and dispenser to comprising of:

a bottom component, with a right edge and a left edge, a front edge and a back edge and a top side and a bottom side with four small interlocking extensions, two extensions on the right edge and two extensions on the left edge, a recessed approximately half circle area at the front edge, and a recessed connecting area at the back edge of the bottom component;

a front component, with a right edge, a left edge, a top edge, a bottom edge, an inside side and an outside side with a slot opening that extends down from the top edge of the front component, a horizontal section with a top edge and a bottom edge which extends from the right edge to the left edge of the front component, the horizontal section is below the slot opening, the horizontal section with a large recessed area, approximately halfway between the left edge and the right edge, on the bottom of the horizontal, a smaller recessed area to the right side of the large recessed area and a smaller recessed area to the left side of the large recessed area, the recessed area width less than the width of the large recessed area of the front component has left side and a right side, with the slot opening in the middle, the right side of the top edge of the front component having two connection extensions and the left side of the top side of the front component having two connection extensions, and the right edge of front component having an indention connecting area, and the left edge of the front component having an indentation connection area;

a left side component, with a top edge, a bottom edge, a left edge and a right edge, a, outside side and an inside side, with openings, a slanted bottom edge, and above the slanted edge, connecting openings, interlocking extensions on both the right edge and the left edge, and indents on the outside side for holding magnets;

a left side component with a right edge, a left edge, a top edge, a bottom edge, an inside side and an outside side, with openings, a slanted bottom edge, and above the slanted edge, connecting openings for connecting tabs on the bottom component, interlocking extensions on both sides, and indents for holding magnets;

a back component with right edge, a left edge, a top edge, a bottom edge, an inside side and an outside side, with openings, indentations for magnets, a hole designed to go over a fastener, recessed connections areas on the right edge and the left edge of the back component, and a connecting extension on the bottom edge of the back component;

a right side component with a right edge, a left edge, a top edge, a bottom edge, a an outside side and an inside side, with openings, a slanted bottom side edge, and above the slanted edge, joint openings, connecting openings, interlocking extensions on the right side of the right side component and the left side of the right side component, and indents for holding magnets, a front extension and a back extension;

whereby the soft jacket can cooler holder and dispenser can be snapped together through of interlocking extensions, recessed connecting areas, connecting openings, indent connecting areas, interlocking connection extensions, and interlocking connecting tabs;

whereby multiple soft jacket can coolers can be loaded into the the multiple soft jacket can coolers holder and dispenser at the same time;

whereby the smaller recessed area extending upward into the horizontal section of the front component is wider than the bottom of the collapsed soft jacket can cooler but narrower than the total width of the collapsed soft jacket can cooler;

whereby the device can be assembled by snapping together interlocking components, the interlocking extensions in the bottom component connect to recessed connecting areas in the side component, the recessed area in the bottom component connects to the interlocking extension of the back component, and recessed connecting areas on the left edge and the right edge of the front component fit into the interlocking extensions of the left side and right side components, the left side and right side components have joint openings, interlocking extensions connecting the bottom component, the left side component, and the right side component.

2. The multiple soft jacket can cooler jackets holder and dispenser of claim 1 with a hinge connecting point near the top right corner of the inside side of the left side component and a hinge connecting point near the top right corner of the inside of the right side component and a hinged top component with a front edge, a back edge, a top side and a bottom side, a front side and a back side, with an "U" shaped open area, between the right edge and the left edge of the hinged top component, a "U shaped open area open on the top side of the hinged top component, the "U shaped open on the front edge of the hinged top component and the "U" shaped opening closed on the back edge of the hinged top component, the front edge of the hinge top component has interlocking extensions; and a hinging mechanism on the right edge of the top component near the back edge of the hinged top component and a hinging mechanism on the left edge of the hinged top component near the back edge of the hinged top component, whereby individual soft jacket can coolers can be inserted into the multiple soft jacket can cooler jackets holder and dispenser through the opening on the top component with the hinged top component in the closed position;

whereby indents on the top edge of the front component fit the interlocking extension on the hinged top component.

* * * * *